United States Patent
Oliver

(10) Patent No.: US 10,078,750 B1
(45) Date of Patent: Sep. 18, 2018

(54) METHODS AND SYSTEMS FOR FINDING COMPROMISED SOCIAL NETWORKING ACCOUNTS

(71) Applicant: Trend Micro Incorporated, Tokyo (JP)

(72) Inventor: Jonathan James Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 622 days.

(21) Appl. No.: 14/303,986

(22) Filed: Jun. 13, 2014

(51) Int. Cl.
*G06F 21/50* (2013.01)
*G06F 17/30* (2006.01)
*H04L 12/58* (2006.01)

(52) U.S. Cl.
CPC ........ *G06F 21/50* (2013.01); *G06F 17/30864* (2013.01); *H04L 51/32* (2013.01)

(58) Field of Classification Search
CPC ..... H04L 63/14; H04L 63/102; H04L 63/104; H04L 63/12; H04L 51/12; G06F 21/552; G06F 21/554; G06F 21/316
See application file for complete search history.

(56) References Cited

U.S. PATENT DOCUMENTS

| | | | |
|---|---|---|---|
| 7,021,534 B1 | 4/2006 | Kiliccote | |
| 7,590,707 B2 | 9/2009 | McCloy, III et al. | |
| 7,802,298 B1 | 9/2010 | Hong et al. | |
| 7,854,001 B1 | 12/2010 | Chen et al. | |
| 7,984,500 B1 | 7/2011 | Khanna et al. | |
| 8,381,292 B1 | 2/2013 | Warner et al. | |
| 8,468,597 B1 | 6/2013 | Warner et al. | |
| 8,495,735 B1 | 7/2013 | Warner et al. | |
| 2005/0160330 A1 | 7/2005 | Embree et al. | |
| 2006/0041508 A1 | 2/2006 | Pham et al. | |
| 2006/0064374 A1 | 3/2006 | Helsper et al. | |
| 2006/0070126 A1 | 3/2006 | Grynberg et al. | |
| 2006/0080735 A1 | 4/2006 | Brinson et al. | |
| 2006/0101120 A1 | 5/2006 | Helsper et al. | |
| 2006/0123464 A1 | 6/2006 | Goodman et al. | |
| 2006/0123478 A1 | 6/2006 | Rehfuss et al. | |
| 2006/0168066 A1 | 7/2006 | Helsper et al. | |
| 2007/0112814 A1 | 5/2007 | Chesshire | |
| 2007/0118904 A1 | 5/2007 | Goodman et al. | |

(Continued)

OTHER PUBLICATIONS

Seems Somebody is Clicking on That Spam—New York Times, Jul. 3, 2006, 1 sheet [retrieved on Jun. 2, 2014], retrieved from the internet: http://www.nytimes.com/2006/07/03/technology/03drill.html.

(Continued)

*Primary Examiner* — Hadi S Armouche
*Assistant Examiner* — Paul E Callahan
(74) *Attorney, Agent, or Firm* — Okamoto & Benedicto LLP

(57) ABSTRACT

Social messages sent or posted by users of a social networking service are collected. Compromised social networking accounts are identified from the collected social messages. Keywords indicative of compromised social networking accounts are extracted from social messages of identified compromised social networking accounts. The keywords are used as search terms in a search query for additional social messages. Additional compromised social networking accounts are identified from search results that are responsive to the search query.

20 Claims, 9 Drawing Sheets

(56) References Cited

U.S. PATENT DOCUMENTS

| | | |
|---|---|---|
| 2007/0282739 A1 | 12/2007 | Thomsen |
| 2008/0028444 A1 | 1/2008 | Loesch et al. |
| 2008/0034073 A1 | 2/2008 | McCloy et al. |
| 2008/0082662 A1 | 4/2008 | Dandliker et al. |
| 2008/0133540 A1 | 6/2008 | Hubbard et al. |
| 2010/0095378 A1 | 4/2010 | Oliver et al. |
| 2011/0167474 A1 | 7/2011 | Sinha et al. |
| 2012/0222111 A1 | 8/2012 | Oliver et al. |
| 2012/0227104 A1 | 9/2012 | Sinha et al. |
| 2014/0259157 A1* | 9/2014 | Toma .................. H04L 63/1408 726/22 |

OTHER PUBLICATIONS

Does the Twitter Follower Scam Actually Work / Security Intelligence Blog / Trend Micro, Jan. 30, 2014, 4 sheets [retrieved on Jun. 2, 2014], retrieved from the internet: http://blog.trendmicro.com/trendlabs-security-intelligence/does-the-twitter-follower-scam-actually-work/.

Clique problem—Wikipedia, the free encyclopedia, 11 sheets [retrieved on Jun. 2, 2014], retrieved from the internet: http://en.wikipedia.org/wiki/Clique_problem.

Bipartite graph—Wikipedia, the free encyclopedia, 9 sheets [retrieved on Jun. 2, 2014], retrieved from the internet: http://en.wikipedia.org/wiki/Bipartite_graph.

Spam ROI: Profit on 1 in 12.5m Response Rate, Nov. 11, 2008, 5 sheets [retrieved on Jun. 2, 2014], retrieved from the internet: http://www.sitepoint.com/spam-roi-profit-on-1-in-125m-response-rate/.

Trend Micro Simply Security Checking Identities in Social Network Friend Requests, Feb. 28, 2013, 5 sheets [retrieved on Jun. 2, 2014], retrieved from the internet: http://blog.trendmicro.com/checking-identities-in-facebook-friend-request/.

Facebook to put Report Abuse button at fingertips of bullying victims / Naked Security, Nov. 6, 2013, 3 sheets [retrieved on Jun. 2, 2014], retrieved from the internet: http://nakedsecurity.sophos.com/2013/11/06/facebook-to-put-report-abuse-button-at-fingertips-of-bullying-victims/.

Twitter rolls out 'report abuse' button for individual tweets: will you use it?, 4 sheets [retrieved on Jun. 2, 2014], retrieved from the internet: http://www.theguardian.com/technology/blog/2013/aug/30/twitter-report-abuse-button.

Honeypot (computing)—Wikipedia, the free encyclopedia, 4 sheets [retrieved on Jun. 2, 2014], retrieved from the internet: http://en.wikipedia.org/wiki/Honeypot_(computing).

URL shortening—Abuse—Wikipedia, the free encyclopedia, 1 sheet [retrieved on Jun. 5, 2014], retrieved from the internet: http://en.wikipedia.org/wiki/URL_shortening_-_Abuse.

URL shortening—Wikipedia, the free encyclopedia, 7 sheets [retrieved on Jun. 5, 2014], retrieved from the internet: http://en.wikipedia.org/wiki/URL_shortening.

URL redirection—Wikipedia, the free encyclopedia, 11 sheets [retrieved on Jun. 5, 2014], retrieved from the internet: http://en.wikipedia.org/wiki/URL_redirection.

E. Zangerle and G. Specht "Sorry, I was hacked": A Classification of Compromised Twitter Accounts, Mar. 2014, 7 sheets, retrieved from the internet: http://www.evazangerle.at/wp-content/papercite-data/pdf/sac14.pdf.

J. Xiang, C. Guo and A. Aboulnaga "Scalable Maximum Clique Computation Using MapRedue", Jan. 2014, 12 sheets, retrieved from the internet: https://cs.uwaterloo.ca/~ashraf/pubs/icde13maxclique.pdf.

C. Grier, K. Thomas, V. Paxson and M. Zhang "@spam: The Underground on 140 Characters or Less", Oct. 2010, 11 sheets, In Proceeding of the 17th ACM Conference on Computer and Communications Security, retrieved from the internet: http://www.icir.org/vern/papers/ccs2010-twitter-spam.pdf.

C. Kanich, C. Kreibich, K. Levchenko, B. Enright, G. Voelker, V. Paxson and S. Savage "Spamalytics: An Emperical Analysis of Spam Marketing Conversion" 2008, 12 sheets, In Proceeding of the 15th ACM Conference on Computer and Communications Security, retrieved from the internet: http://www.icsi.berkeley.edu/pubs/networking/2008-ccs-spamalytics.pdf.

M. Egele, G. Stringhini, C. Kruegel and G. Vigna "COMPA: Detecting Comprimised Accounts on Social Networks", 2013, 17 sheets, retrieved from the internet: http://www.cs.ucsb.edu/~gianluca/papers/thjp-ndss13.pdf.

Michael Steven Svendsen "Mining maximal cliques from large graphs using MapReduce", 2012, 45 sheets, retrieved from the internet: http://lib.dr.iastate.edu/cgi/viewcontent.cgi?article=3631&context=etd.

Yun-Chian Cheng "Hadoop Sucess Stories in Trend Micro SPN", Oct. 2012, 30 sheets, retrieved from the internet: http://www.gwms.com.tw/TREND_HadoopinTaiwan2012/1002download/04.pdf.

Chung-Tsai Su, S. Tsao, W. Chu and R. Liao "Mining Web Browsing Log by Using Relaxed Biclique Enumeration Algorithm in MapReduce", 2012, 47 sheets, vol. 3, IEEE/WIC/ACM International Conferences on Web Intelligence and Intelligent Agent Technology.

\* cited by examiner

METHODS AND SYSTEMS FOR FINDING COMPROMISED SOCIAL NETWORKING ACCOUNTS

BACKGROUND OF THE INVENTION

1. Field of the Invention

The present invention relates generally to computer security and more particularly but not exclusively to methods and systems for finding compromised social networking accounts.

2. Description of the Background Art

A social networking service provides users a platform for building social networks or social relations over a public computer network, such as the Internet. Examples of popular social networking services on the Internet include the FACEBOOK and TWITTER social networking services. The FACEBOOK social networking service allows users to socialize by posting on webpages and sending messages to each other. The TWITTER social networking service allows users to socialize by sending and receiving text messages, which are commonly referred to as "tweets." Social networking services are vulnerable to being abused for malicious purposes. For example, a social networking account may be hijacked from its registered owner or employed by its registered owner to send spam messages.

SUMMARY

In one embodiment, social messages sent or posted by users of a social networking service are collected. Compromised social networking accounts are identified from the collected social messages. Keywords indicative of compromised social networking accounts are extracted from social messages of identified compromised social networking accounts. The keywords are used as search terms in a search query for additional social messages. Additional compromised social networking accounts are identified from search results that are responsive to the search query These and other features of the present invention will be readily apparent to persons of ordinary skill in the art upon reading the entirety of this disclosure, which includes the accompanying drawings and claims.

DESCRIPTION OF THE DRAWINGS

FIG. 3 shows an example aggressive spam tweet message.

FIG. 4 shows an example passive spam tweet message.

FIG. 8 shows example search results of tweet messages.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
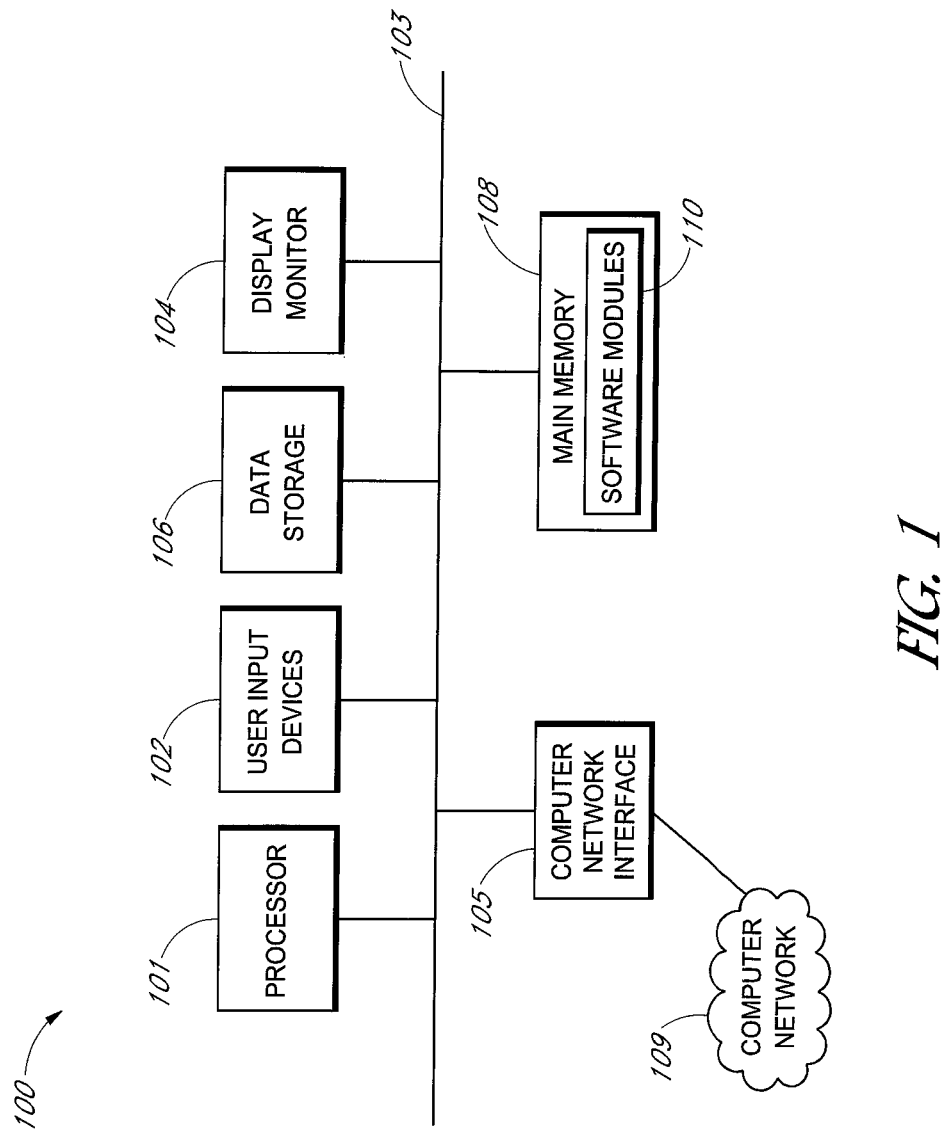
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as part of a backend system or other computer system described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise analysis modules when the computer 100 is employed as part of a backend system.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
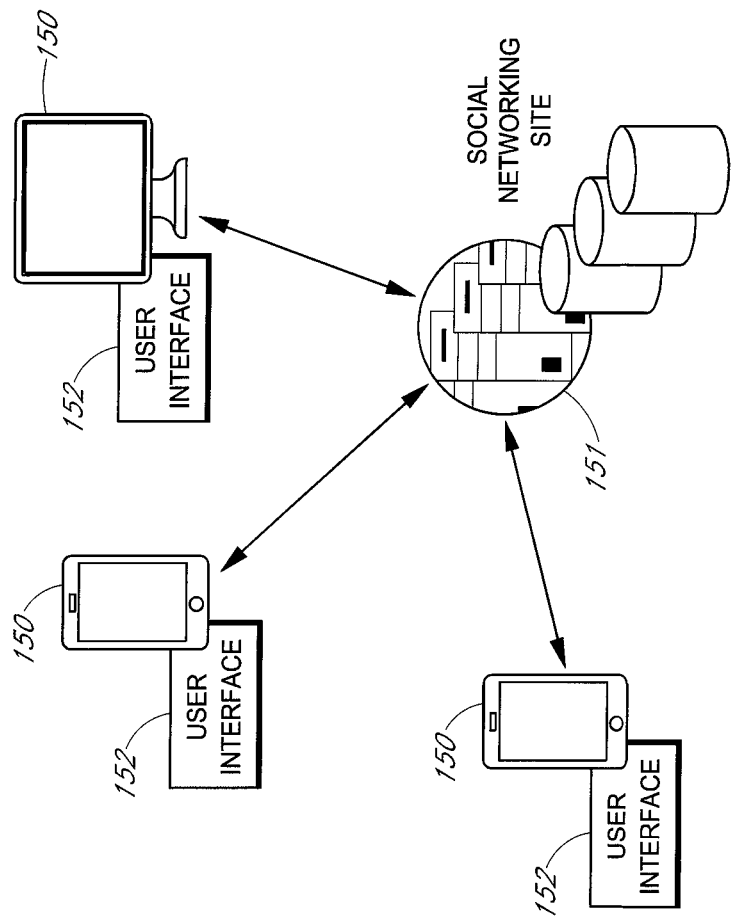
FIG. 2 shows a schematic diagram of an example social networking site that provides a social networking service.

FIG. 2 shows a schematic diagram of an example social networking site 151 that provides a social networking service to users of computers 150. The social networking site 151 may comprise one or more computers and associated software for providing the social networking service. The social networking site 151 may be that of the FACEBOOK social networking service, the TWITTER social networking service, or some other social networking service. A message or other document that is sent or received by way of a social networking service is also referred to herein as a "social message." A social message may be a posting on a webpage of the FACEBOOK networking site. A social message may also be a tweet message sent by way of the TWITTER social networking site. A tweet message is typically a short (e.g., 140-character or less) text message sent by Short Message Service (SMS) over a mobile phone network. A tweet message may also be sent over the Internet by way of a web interface, e.g., by using a web browser to communicate with the TWITTER social networking site. Some social networking services are peer-to-peer (e.g., PEERSON social network), in which case social messages are sent directly between user devices, such as directly between computers 150.

A computer 150 may comprise a computer employed by a user to access the service provided by the social networking site 151. For example, the computer 150 may comprise a mobile phone or other mobile computing device (e.g., tablet computer). The computer 150 may also be other user computers, such as a desktop or laptop computer. The computer 150 may include a user interface 152 for accessing the social networking service, such as a web browser, dedicated client software, peer-to-peer software, or SMS user interface for communicating with the social networking site 151. The computers 150 may communicate with the social networking site 151 over a mobile phone network in the case of a tweet message sent by SMS. The computers 150 may also communicate with the social networking site 151 over the Internet. In the case of a peer-to-peer social networking service, the computers 150 may communicate directly with each other without going through the social networking site 151 depending on the topology of the social network infrastructure.

Just like other online services, social networking services are vulnerable to being abused. For example, a social networking account, i.e., an account with a social networking service, may be used to send unsolicited messages, which are also referred to as "spam." The spam may be sent by its registered owner or by someone who hijacked the social networking account from its registered owner.

A spam is especially dangerous when sent by way of a social networking service because social messages are typically received from a sender that is associated with the recipient. More specifically, a social message is typically from someone that the recipient knows, such as a friend of the recipient or someone being followed by the recipient. Therefore, the recipient is much more likely to fall victim to a spam social message. Worse, spam social messages are typically received in mobile phones, which often do not have the requisite computing resources to run a proper antivirus/anti-spam or other computer security modules.

As a particular example involving the TWITTER social networking service, the inventor has classified at least two different types of spam messages, as now explained with reference to FIGS. 3 and 4. It is to be noted that actual user names have been blacked out in the tweet messages of FIGS. 3, 4, 8 and 9.

Figure 3:
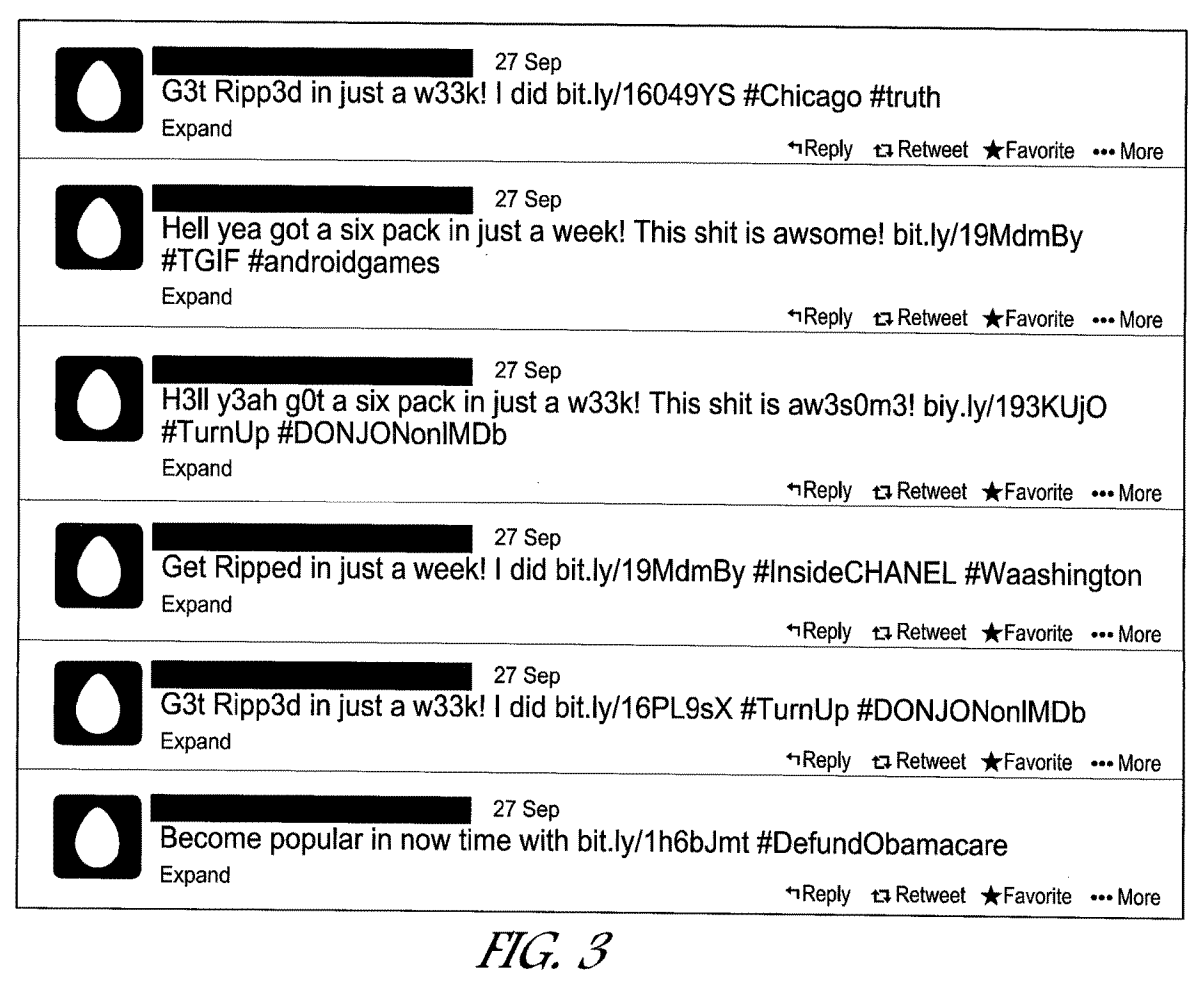

FIG. 3 shows an example aggressive spam message sent through the TWITTER social networking service. An aggressive spam message typically includes content that actively entices the recipient to do something, such as to click a link, to visit a website, or to send another message. Some characteristics of aggressive spam messages discovered by the inventor include:

a) The use of un-related hash tags. The hash tags are typically popular hash tags that are included to attract the recipient to click on the link;
b) The use of misspelled words and including numbers in words (e.g., "3" to represent "e");
c) The use of Uniform Resource Locator (URL) shorteners to make it more difficult to identify all the spam messages going to a spam website; and
d) Typical content includes weight loss and attracting a larger social media presence—offering services for getting more YOUTUBE views, and for attracting more TWITTER followers.

Figure 4:
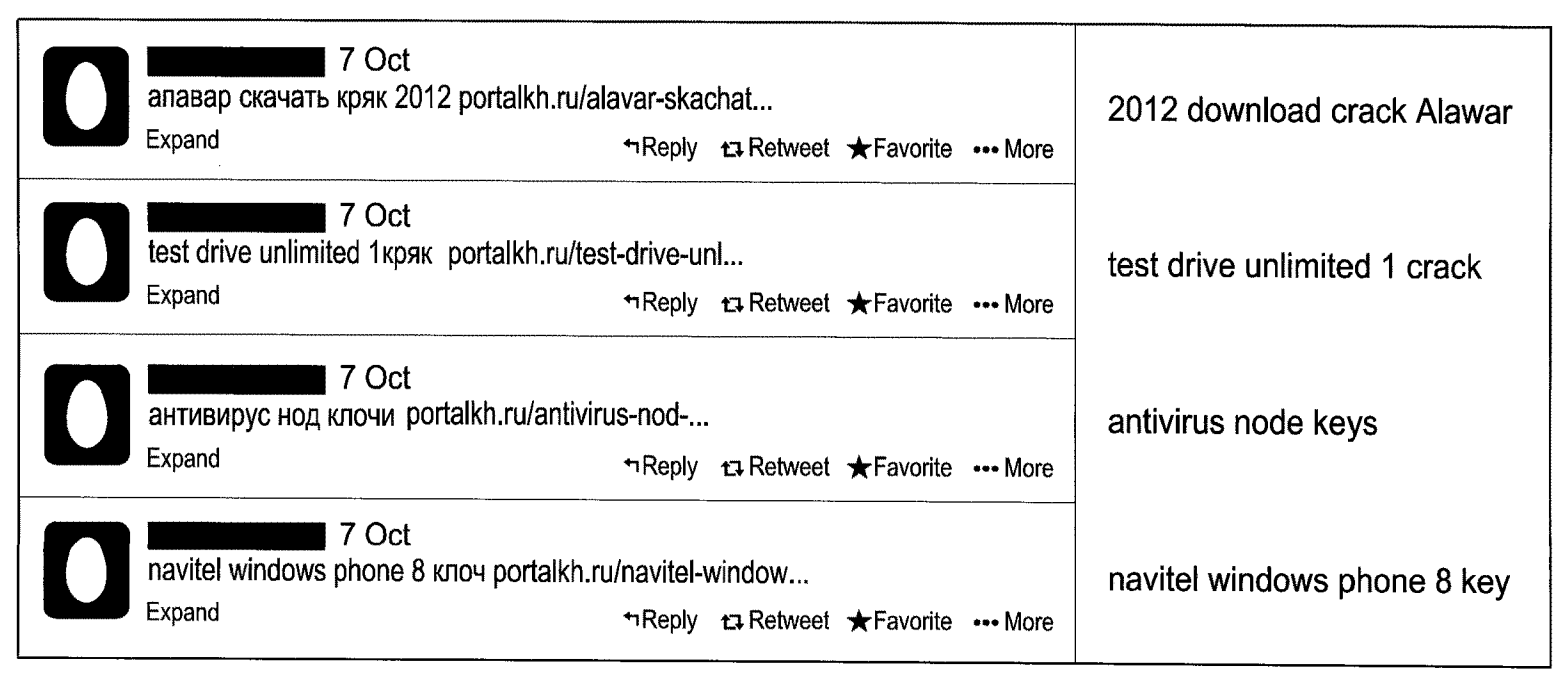

FIG. 4 shows an example passive spam message sent through the TWITTER social networking service. Unlike an aggressive spam message, a passive spam message is inconspicuous and designed to not attract attention and fly "under the radar." Passive spam messages cover a range of content that users may search for and are even willing to use tools, such as GOOGLE translate, to understand. In the example of FIG. 4, the passive spam tweet message is in Russian; the English translation is provided on the right. Some characteristics of passive spam messages discovered by the inventor include:

a) No hash tags or limited use of hash tags;
b) The content is in a non-English language, typically in Russian;
c) Use of many domains outside the United States and Western Europe; many of the domains are hosted in Russia and the Ukraine;
d) Have a wide range of content of a very dubious nature, including topics such as: solutions to homework assignments and exams, free or cheap copies of copyrighted material, cracked software and games, license keys for legitimate products (e.g., ADOBE software), messages offering cheap and knock off computer, printer and mobile phones.

Figure 5:
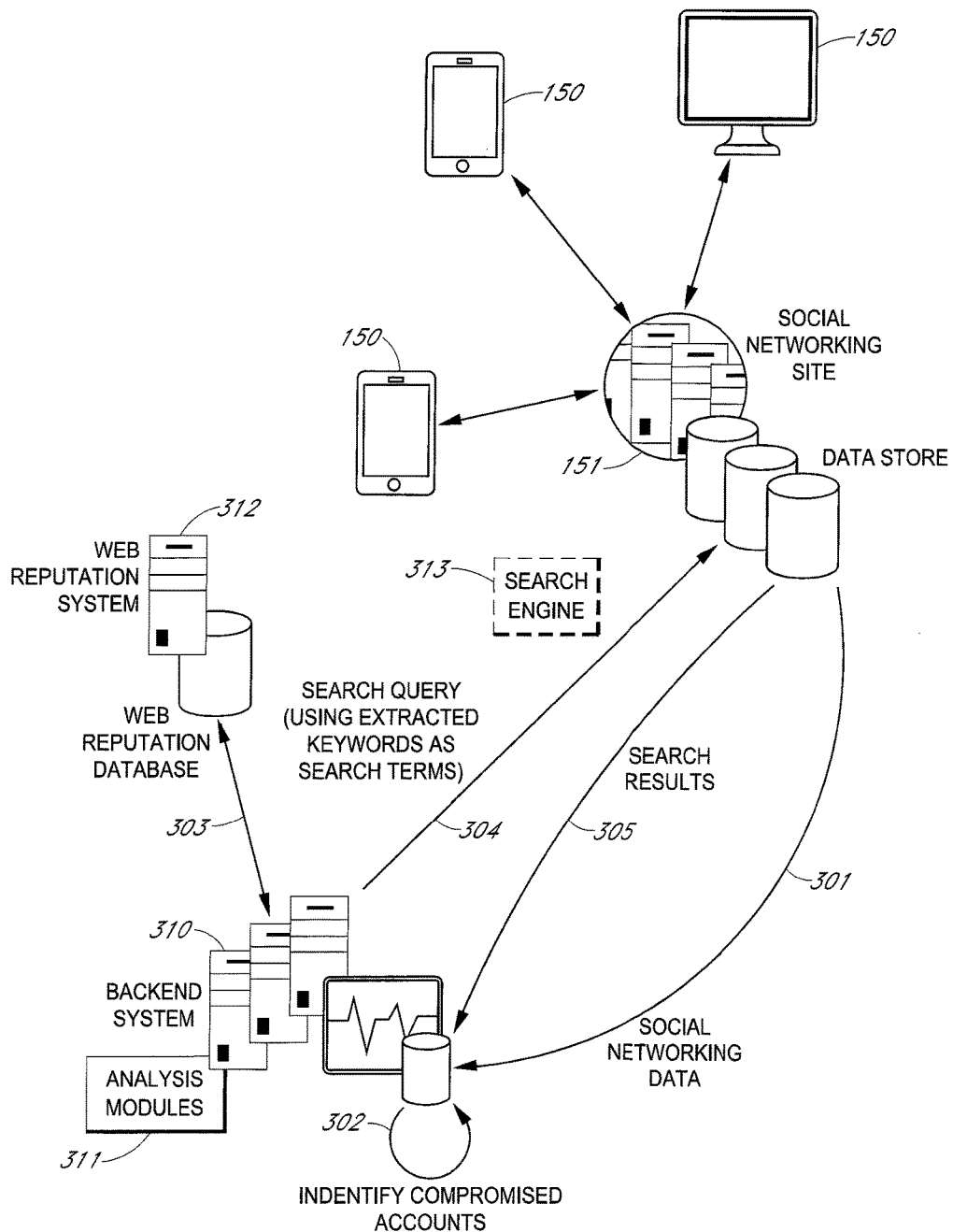
FIG. 5 shows a schematic diagram of a system for finding compromised social networking accounts in accordance with an embodiment of the present invention.

FIG. 5 shows a schematic diagram of a system for finding compromised social networking accounts in accordance with an embodiment of the present invention. In the example of FIG. 5, the social networking site 151 provides social networking service to users of the computers 150.

A social networking account is an account with a social networking service. A social networking account is compromised when it is hijacked from its owner or the owner is using the account in a way that violates the social networking service's Terms of Use. For example, a social networking account is compromised when the account is employed to perform an illegal or unauthorized activity, such as sending spam messages. As another example, an account is compromised when some malware or malicious application performs malicious actions using the account without the owner's authorization, as in the case when the owner is a victim of phishing or some drive-by install.

In the example of FIG. 5, a backend system 310 comprises one or more computers for receiving social networking data from the social networking site 151, analyzing the social networking data to identify compromised social networking accounts, extracting keywords from the identified social networking accounts, using the extracted keywords as search terms in searching for more social networking data, and finding compromised networking accounts from the search results. The backend system 310 may be maintained and operated by a computer security company, such as TREND MICRO, INC., for example. The backend system 310 may be employed to find compromised social networking accounts and inform the social networking service about the compromised social networking accounts. The social networking service may suspend or cancel the compromised social networking accounts to prevent abuse of the social networking service. The backend system 310 may also be employed to inform other services of the compromised social networking accounts to block or quarantine social messages from the accounts. Information about the compromised social networking accounts may also be employed for other computer security-related purposes without detracting from the merits of the present invention.

In the example of FIG. 5, the backend system 310 includes analysis modules 311. In one embodiment, the analysis modules 311 comprise software modules for finding or facilitating finding of compromised social networking accounts. The analysis modules 311 may include scripts, a web browser, statistical and graph analysis software, parser, interface for communicating with a remote computer (e.g., web reputation system 312, social networking site 151), and other software.

In the example of FIG. 5, the system for detecting compromised social networking accounts includes a web reputation system 312. The web reputation system 312 may comprise the TREND MICRO web reputation system, for example. Other web reputation systems may also be employed without detracting from the merits of the present invention. Generally speaking, a web reputation system comprises one or more computers that host a web reputation database containing information on known malicious and known legitimate (i.e., non-malicious) websites and other hosts on the Internet. In the example of FIG. 5, the web reputation system 312 may be consulted to determine the reputation of a uniform resource locator (URL), such as whether the URL is known to be malicious, known to be legitimate, or has an unknown reputation. The backend system 310 may communicate with the web reputation system 312 and the social networking site 151 over the Internet.

In an example operation, the backend system 310 collects social networking data by receiving a sampling of social networking data from the social networking site 151 (arrow 301). The social networking data may comprise social messages, such as tweet messages and/or webpages containing user postings, user profile webpage, and other data associated with social networking accounts.

Compromised social networking accounts are identified from the collected social networking data (arrow 302). For example, to identify a compromised social networking account, the collected social networking data may be scanned for characteristics indicative of spam messages. As another example, URLs may be extracted from the collected social networking data and provided to the web reputation system 312 to determine the reputation of the extracted URLs (arrow 303). The web reputation system 312 may indicate whether or not an extracted URL is known to be a malicious URL. Social networking accounts that send social messages containing malicious URLs may be deemed to be compromised.

Keywords extracted from social messages sent by the identified compromised social networking accounts are used as search terms in searching the social networking site 151 for additional social networking data (arrow 304). For example, the identified compromised social networking accounts may be evaluated to find keywords that are indicative of a compromised social networking account. A search query with the keywords as search terms may then be sent to the social networking site 151. This allows the social networking site 151 to be searched for additional social networking data containing the keywords. A search engine 313 may be employed to perform the search using the keywords as search terms. The search engine 313 may be part of the social networking site 151 (e.g., <<https://twitter.com/search-home>>), a public/general Internet search engine (e.g., GOOGLE search engine), or hosted by the backend system 310, for example.

The search results may be provided to the backend system 310 and analyzed to find more compromised social networking accounts (arrow 305). The extracted keywords may also be sent to the computers 150 to allow additional precautions to be taken against messages received by the computers 150 and containing the extracted keywords. Additional actions that may be performed include warning the user, putting social messages in a sandbox for further analysis, etc.

It is to be noted that the backend system 310 may be maintained and operated by a computer security company that is not associated with the social networking service. In that case, the backend system 310 and the social networking site 151 may be in separate private computer networks and communicate over the Internet. As can be appreciated, the social networking service may also be maintaining and operating the backend system 310. For example, the functionality of the backend system 310 may be incorporated as part of the social networking site 151.

It is to be further noted that social messages and other data associated with social networking accounts may be received from the social networking site 151 or other data store. For example, social messages and other data associated with the social networking accounts may also be obtained directly from user devices (e.g., computers 150) depending on the topology of the social networking infrastructure.

Figure 6:
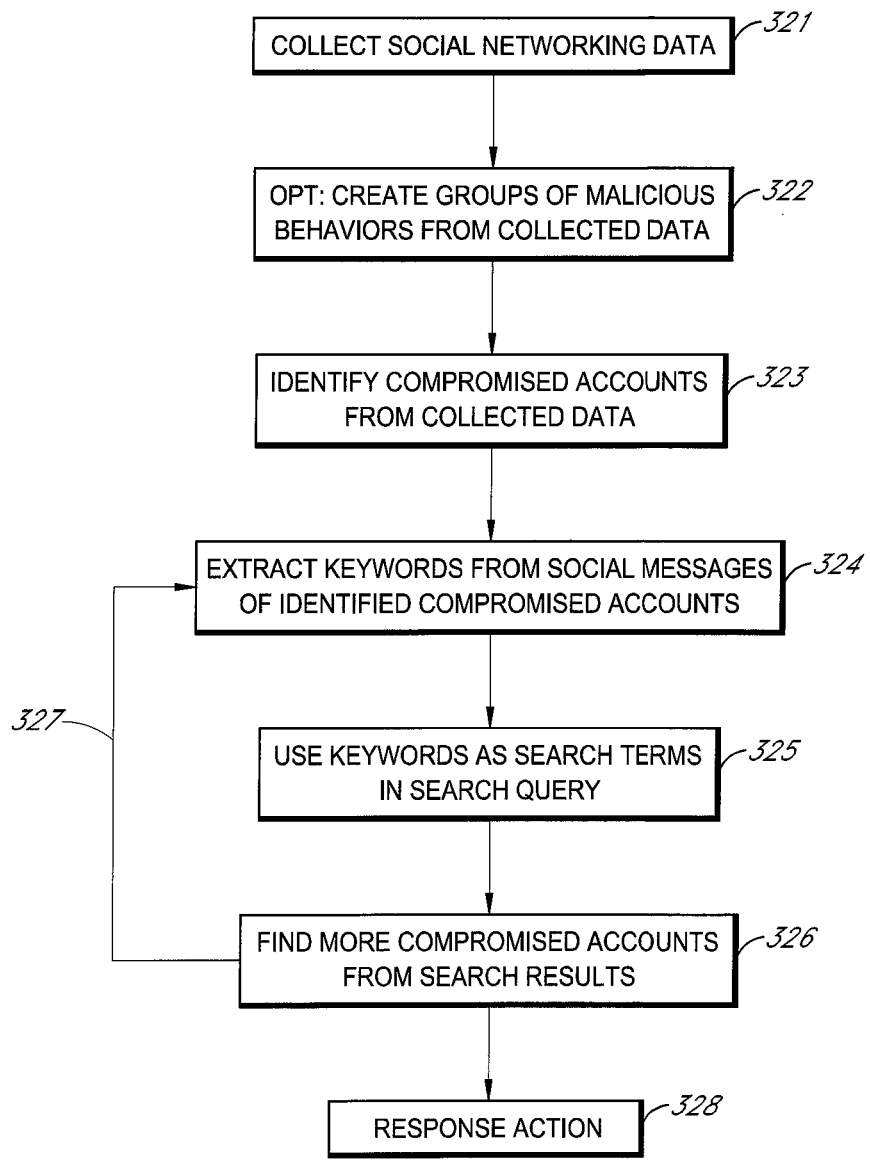
FIG. 6 shows a flow diagram of a method of finding compromised social networking accounts in accordance with an embodiment of the present invention.

FIG. 6 shows a flow diagram of a method of finding compromised social networking accounts in accordance with an embodiment of the present invention. The method of FIG. 6 may be performed using the components shown in FIG. 5. Other components may also be employed without detracting from the merits of the present invention.

In the example of FIG. 6, social networking data are collected from the social networking site or other data source (step 321). The social networking data may comprise social messages or other data associated with the social networking account, such as a profile page of the user. Using the TWITTER social networking service as an example, the social networking data may comprise tweet messages obtained from a sample feed available from the TWITTER social networking site (e.g., from <<https://dev.twittercom/docs/api/1.1/get/statuses/sample>>).

Optionally, the collected social networking data may be pre-processed into groups of malicious behaviors (step 322). Grouping the social networking data advantageously allows for more insight on how the social networking service is abused, thereby facilitating identification of keywords associated with malicious behaviors. A malicious behavior can comprise any activity consistent with or more likely to occur with compromised accounts. Malicious behaviors may include sending spam messages, joining in a distributed denial of service (DDoS) attack, sending messages to their contacts saying they are overseas and need money, and starting to follow lots of people all at once, to name a few examples. Social networking accounts that are not being employed to perform malicious behaviors may be grouped into a separate legitimate group.

Figure 7:
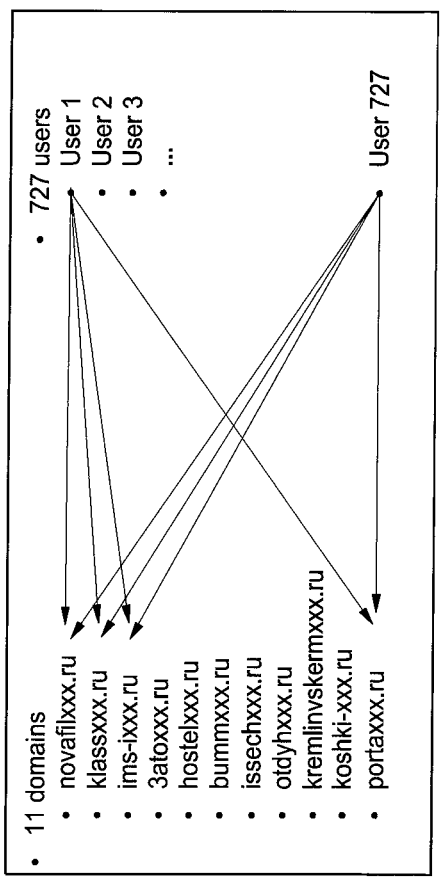
FIG. 7 shows an example of a bipartite clique.

In one embodiment, social networking accounts may be grouped using an approximate bipartite clique algorithm. Identifying bipartite cliques is advantageous in that if groups of social networking accounts that have sent spam messages to the same set of spam domains are found, then it is very likely that any social networking account that sends social messages to all the domains in the clique is also sending spam messages. FIG. 7 shows an example of a bipartite clique found in collected data consisting of 11 domains and 727 users; all the users in the clique sent messages containing links to all the spam domains in the clique.

Compromised social networking accounts are identified from the collected social networking data (step 323). The compromised social networking accounts may be those accounts included in groups of social networking accounts that are associated with malicious behavior. Compromised social networking accounts may also be identified based on URLs included in social messages sent from those accounts. For example, a social networking account that sent a social message containing a malicious URL (e.g., as indicated by the web reputation system 312) may be deemed to be a compromised social networking account. As another example, a social networking account that sends spam messages may be deemed as a compromised social networking account.

Keywords indicative of a compromised social networking account are extracted from social messages or other data of the identified compromised social networking accounts (step 324). One way of extracting keywords from social networking accounts is to use an information theoretic measure. For example, for each group G of users:

(a) Identify a set A of general population of data (which are documents in one form or another, such as tweet messages or webpages); and (b) Identify a set B of the group G of users who have performed a malicious or suspicious behavior. From G we have an associated group of documents (such as tweet messages or webpages).

The keywords to be extracted may be identified by:

(a) Tokenizing the documents in set A and in set B; and (b) Estimating the probability of each token T occurring in the group G and in the set A of general population, i.e., Prob(T|group G) and Prob(T|set A).

The good keywords to be extracted are the ones that maximize, $$\text{Prob}(T|\text{group } G)/\text{Prob}(T|\text{set } A) \qquad \text{EQ. 1}$$

or, equivalently, minimize, $$-\log(\text{Prob}(T|\text{group } G)) + \log(\text{Prob}(T|\text{set } A)) \qquad \text{EQ. 2}$$

Other ways of extracting keywords indicative of a compromised social networking account may also be employed without detracting from the merits of the present invention.

The extracted keywords may be used as search terms to collect more social networking data (step 325). For example, a search query with the extracted keywords as search terms may be sent to the social networking site to search for social messages that contain one or more of the keywords. Compromised social networking accounts may be found from social networking data indicated in the responsive search results (step 326). For example, social messages indicated in the search results may be deemed to be sent by compromised social networking accounts. The process may be repeated by extracting keywords from compromised social networking accounts found from the search results, etc. (see arrow 327) to find yet more compromised social networking accounts.

One or more response actions may be performed upon detection of one or more compromised social networking accounts (step 328). For example, the social networking service may be informed of the compromised social networking accounts. As another example, other computer security services may be informed of the compromised social networking accounts so that social messages from the accounts may be blocked, etc.

In one study, samples of tweet messages are collected from the TWITTER social networking site. The samples were restricted to tweet messages containing one or more URLs. While it is possible to use the TWITTER social networking service to send spam and other messages without using URLs, the majority of spam and other malicious messages on the TWITTER social networking site contain URLs. The TREND MICRO web reputation service was employed to identify which URLs were deemed malicious. Tweet messages containing one or more malicious URLs were deemed to be malicious tweet messages.

An approximate bipartite clique algorithm was applied to the malicious tweet messages to create groups of users based on their malicious behavior. The resulting groups of users are shown in Table 1.

TABLE 1

| Description | % Mallicious Tweets | Senders | Hash Tags | Do-mains | Suspend Account % |
|---|---|---|---|---|---|
| A. Education spam etc | 27.28% | 797 | None | 24 | 10.3% |
| B. Cracked software, games spam | 8.11% | 578 | None | 20 | 31.5% |
| C. Education spam | 6.26% | 539 | None | 20 | 19.7% |
| D. Cracked Software | 6.19% | 9509 | Limited | 21 | 12.0% |
| E. Cracked software spam | 4.39% | 727 | None | 11 | 11.6% |
| F. Printer/mobile spam | 3.72% | 12275 | Low | 3 | 89.1% |
| G. Twitter follower spam | 2.54% | 59205 | Yes | 1 | 2.1% |
| H. Video/Mobile/Cracked software/games spam | 2.23% | 8987 | Low | 50 | 95.2% |
| I. Games, computer spam | 2.04% | 608 | None | 19 | 97.9% |
| J. Education spam etc | 1.99% | 284 | None | 14 | 47.9% |
| K. Shirt-spam | 1.91% | 1699 | | 5 | 74.7% |
| L. Games, mobile, printer spam | 1.81% | 1197 | None | 18 | 98.8% |
| M. Computer/Printer spam | 1.77% | 26603 | Low | 60 | 42.3% |
| N. Games/hardware spam | 1.53% | 2514 | Yes | 70 | 90.0% |
| O. Computer game/mobile device spam | 1.41% | 1491 | None | 73 | 94.7% |
| P. credit spam and education spam | 1.08% | 8541 | None | 32 | 72.5% |
| Q. Cracked software and games spam | 1.02% | 9066 | None | 4 | 98.6% |
| Other spam | 24.74% | | | | |

The columns in Table 1 are defined as follows:

(a) The "Description" column gives a description of the content of the tweet messages. Each "description" represents a group of users. Table 1 shows Groups A (Education spam), B (Cracked software games spam), etc.

(b) The "% Malicious Tweets" column gives the percentage of malicious tweet messages out of the total of 28 million tweet messages collected.

(c) The "Senders" column indicates the number of confirmed senders in the clique. So a confirmed sender has sent tweet messages to all the domains in the clique. For example, there were 797 senders who sent at least 24 tweet messages with links going to all 24 domains in Group A. The number of senders in group G is simply the number of senders who sent tweet messages with URLs that linked to a TWITTER follower scam website—in this case there was no convenient confirmation step to separate legitimate users who re-tweeted spam messages from the users under spammer control.

(d) The "HashTags" column gives a summary of the use of hashtags in the spam in each group.

(e) The "Domains" column lists the number of domains. For some groups there were multiple hosts being used from the same domain. For example, Group H had 5 separate domains and used 10 distinct hosts to each of the domains.

(f) The "Suspended Account %" is the percentage of these accounts that had been suspended when last checked (2 months after the study period).

Keywords from the groups of users were extracted using an information theoretic measure. Some of the extracted keywords include "uchebnik" (Russian for tutorial), "reshebnik", "yazyku" (Russian for language), and "kartridzhi" (Russian for cartridges). It is to be noted that these keywords are not search terms that a human security researcher would normally use and are not the type of search terms that the cybercriminals involved are attempting to hide. The keywords are sufficiently obscure that the cybercriminals are not aware that the keywords are very strong indicators of compromised accounts. Still, embodiments of the present invention advantageously allow for identification and extraction of these keywords.

Figure 8:
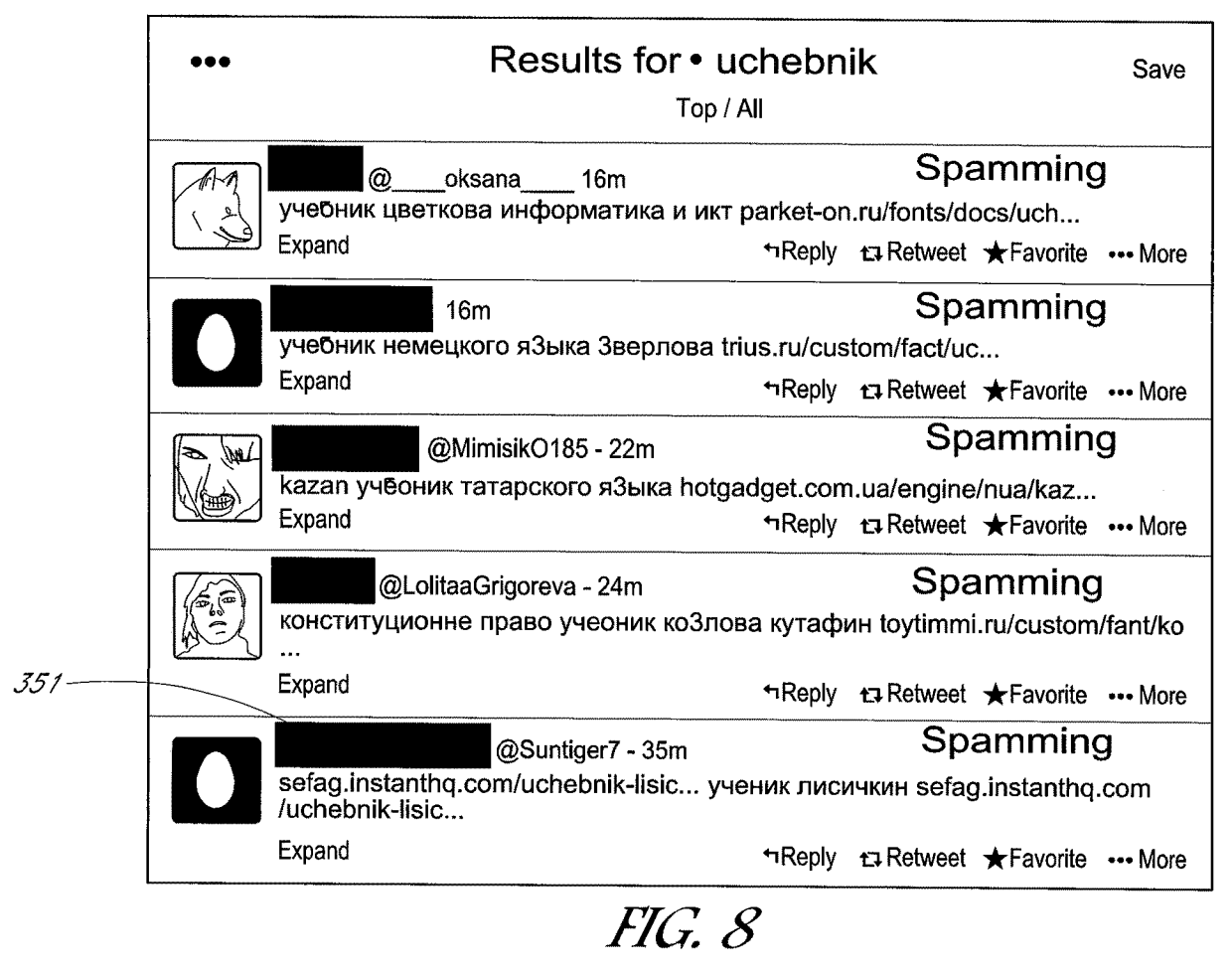

Using one of the extracted keywords, which is "uchebnik", as a search term into the TWITTER networking site using the TWITTER search engine (e.g., <<https://twitter.com/search-home>>) gives the search results shown in FIG. 8. FIG. 8 only shows the first five search results, all of which are spam tweet messages. The search actually returned hundreds of spamming social networking accounts.

Figure 9:
FIG. 9 shows example tweet messages from a compromised account that was identified using an embodiment of the present invention.

Further investigation was conducted on one of the social networking accounts identified in the search results of FIG. 8 to validate the efficacy of the process. In particular, investigation of the account of the fifth user in the search results of FIG. 8 (see 351) revealed the tweet messages shown in FIG. 9. The fifth user sent her first tweet on Jun. 20, 2012; she was writing in English. She then sent a blank tweet message on Feb. 10, 2014 and another on Feb. 19, 2014 three hours before the screen shot of FIG. 9 was taken. As shown in FIG. 9, she started sending tweet messages in Russian (along with hundreds of other users) to Russian spam domains. The obvious conclusion is that her account was indeed compromised.

Methods and systems for finding compromised social networking accounts have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for finding a compromised social networking account, the system comprising:
   a social networking site comprising one or more computers that provide a social networking service over the Internet; and
   a backend system for receiving social messages from the social networking site, identifying compromised social networking accounts from the received social messages, extracting keywords from social messages of the identified compromised social networking accounts, sending a search query with the extracted keywords as search terms, receiving search results responsive to the search query from the social networking site, and finding additional compromised social networking accounts from social messages that are included in the search results.

2. The system of claim 1, further comprising:
   a web reputation system for providing reputations of uniform resource locators (URL) extracted by the backend system from the received social messages.

3. The system of claim 1, wherein the received social messages comprise tweet messages.

4. The system of claim 1, wherein the received social messages comprise webpages.

5. The system of claim 1, wherein the identified compromised social networking accounts send spam messages.

6. The system of claim 1, wherein the identified compromised social networking accounts are accounts that have been hijacked from their registered owner.

7. A method of finding a compromised social networking account, the method comprising:
   receiving in a computer a sampling of messages from a social networking service;
   identifying compromised social networking accounts of the social networking service from the sampling of messages;
   extracting keywords from identified compromised social networking accounts; and
   searching a social networking site of the social networking service using the extracted keywords as search terms.

8. The method of claim 7, further comprising:
   receiving search results responsive to the searching; and
   finding additional compromised social networking accounts from the search results.

9. The method of claim 7, wherein identifying the compromised social networking accounts of the social networking service from the sampling of messages comprises:
   extracting a uniform resource locator (URL) from the sampling of messages; and
   determining a reputation of the URL.

10. The method of claim 9, wherein determining the reputation of the URL comprises consulting a web reputation system over the Internet.

11. The method of claim 7, wherein the sampling of messages comprise webpages.

12. The method of claim 7, wherein the sampling of messages comprise tweet messages.

13. The method of claim 7, wherein identifying the compromised social networking accounts of the social networking service from the sampling of messages comprises:
   identifying spam messages from the sampling of messages.

14. A method of finding a compromised social networking account, the method comprising:
   receiving a first set of social messages in a computer system, the first set of social messages being received over the Internet from a social networking site of a social networking service;
   identifying a first set of compromised social networking accounts from the first set of social messages;
   extracting keywords indicative of a compromised social networking account from the first set of compromised social networking account;
   searching the social networking site for a second set of social messages that contain the keywords; and
   receiving in the computer system search results responsive to the searching of the social networking site, the search results including the second set of social messages.

15. The method of claim 14, wherein the first set of social messages comprise tweet messages.

16. The method of claim 14, wherein the first set of social messages comprise webpages.

17. The method of claim 14, wherein identifying the first set of compromised social networking accounts from the first set of social messages comprises:
   consulting a web reputation system for reputations of uniform resource locators (URLs) that are included in the first set of social messages.

18. The method of claim 14, wherein identifying the first set of compromised social networking accounts from the first set of social messages comprises:
   identifying spam messages in the first set of social messages.

19. The method of claim 14, further comprising:
   informing the social networking service about identified compromised social networking accounts.

20. The method of claim 14, further comprising:
finding a second set of compromised social networking accounts from the second set of social messages.

* * * * *